(12) United States Patent
Brick et al.

(10) Patent No.: US 7,048,525 B2
(45) Date of Patent: May 23, 2006

(54) FLOW DIVIDER

(75) Inventors: Mark A. Brick, Pickerington, OH (US); David J. Petty, Johnstown, OH (US)

(73) Assignee: J. E. Grote Company, Columbus, OH (US)

( * ) Notice: Subject to any disclaimer, the term of this patent is extended or adjusted under 35 U.S.C. 154(b) by 231 days.

(21) Appl. No.: 10/625,419

(22) Filed: Jul. 23, 2003

(65) Prior Publication Data
US 2005/0022870 A1   Feb. 3, 2005

(51) Int. Cl.
*F01C 11/00*   (2006.01)
(52) U.S. Cl. .................... 418/209; 418/13; 418/254
(58) Field of Classification Search ............. 418/13, 418/209, 210, 212, 213, 254, 263, 199
See application file for complete search history.

(56) References Cited

U.S. PATENT DOCUMENTS

| 949,638 | A | * | 2/1910 | Stormer | 418/212 |
|---|---|---|---|---|---|
| 3,930,763 | A | | 1/1976 | Rose | |
| 4,009,573 | A | * | 3/1977 | Satz | 418/13 |
| 4,299,546 | A | * | 11/1981 | Stout | 418/212 |
| 5,037,283 | A | * | 8/1991 | Kapur et al. | 418/133 |
| 5,256,043 | A | | 10/1993 | Rose | |
| 5,558,509 | A | | 9/1996 | Jirnov et al. | |
| 5,720,603 | A | | 2/1998 | Miller et al. | |
| 5,758,501 | A | | 6/1998 | Jirnov et al. | |
| 5,906,297 | A | | 5/1999 | Cole | |

FOREIGN PATENT DOCUMENTS

| JP | 63263284 A | * | 10/1988 |
|---|---|---|---|
| JP | 01211684 A | * | 8/1989 |

* cited by examiner

*Primary Examiner*—Theresa Trieu
(74) *Attorney, Agent, or Firm*—Jason H. Foster; Kremblas, Foster, Phillips & Pollick

(57) ABSTRACT

A flow divider for use with fluent materials, such as raw sausage. The flow divider is a combination of at least two housing bodies with chambers defined by elliptical cylindrical sidewalls. Hubs with transverse vanes have necked-down regions at one end that are rotatably mounted in a similarly-sized aperture in an endwall of each housing body. The vanes' tips follow the elliptical cylindrical sidewalls in the manner of a vane pump. Sausage is conveyed from a conventional pump into the inlet of the flow divider, and flows through passages into inlet cavities, one inlet cavity per chamber, through the sub-chambers formed by the space between the vanes, and outlet cavities, one outlet cavity per chamber. The amount of sausage that flows through each chamber is equal due to the driving linkage between the hubs of each housing body.

25 Claims, 6 Drawing Sheets

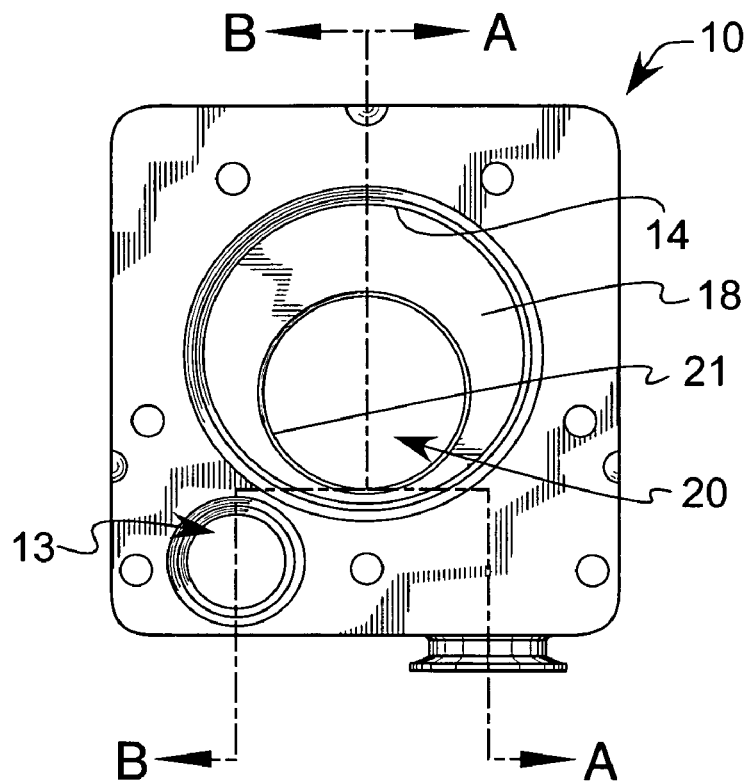
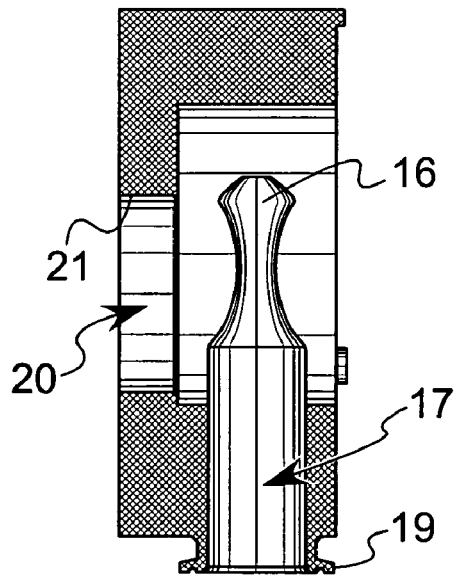
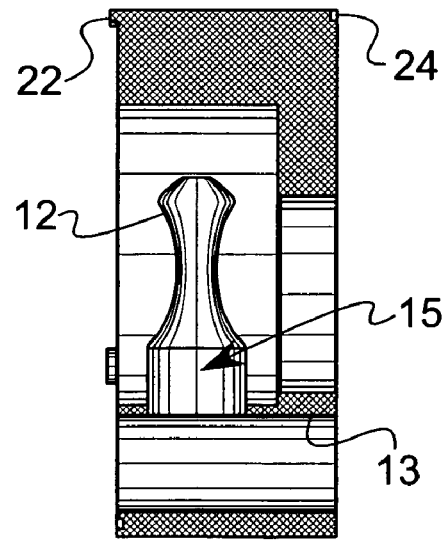
FIG. 1
FIG. 2
FIG. 3

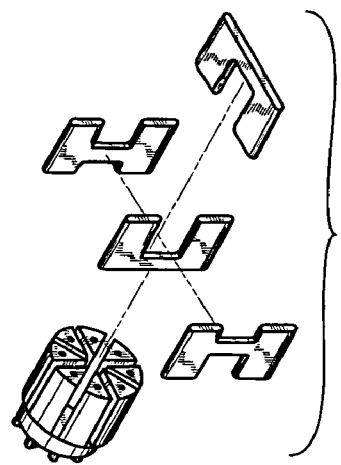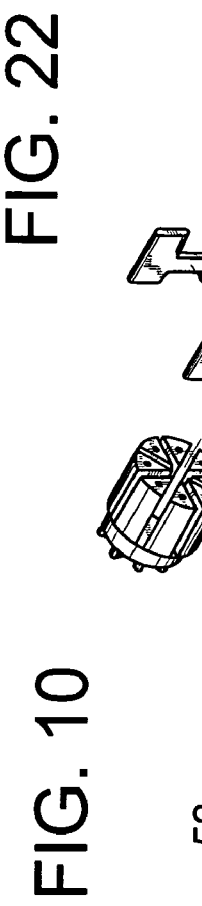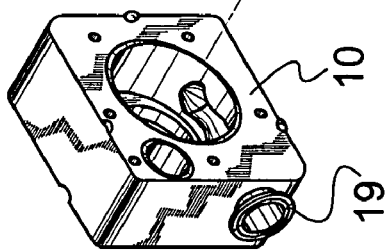
FIG. 22
FIG. 21
FIG. 11
FIG. 10
FIG. 9

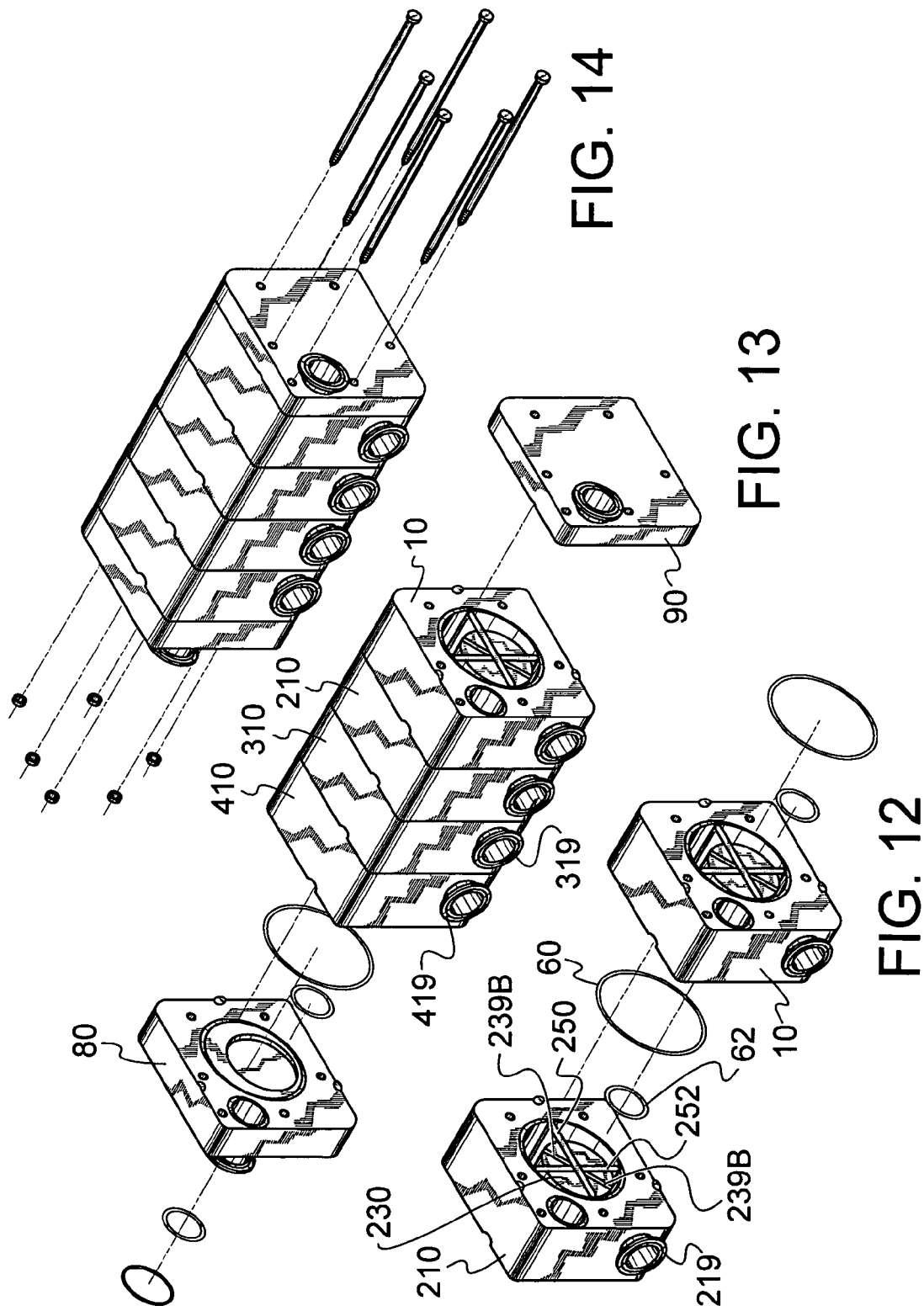

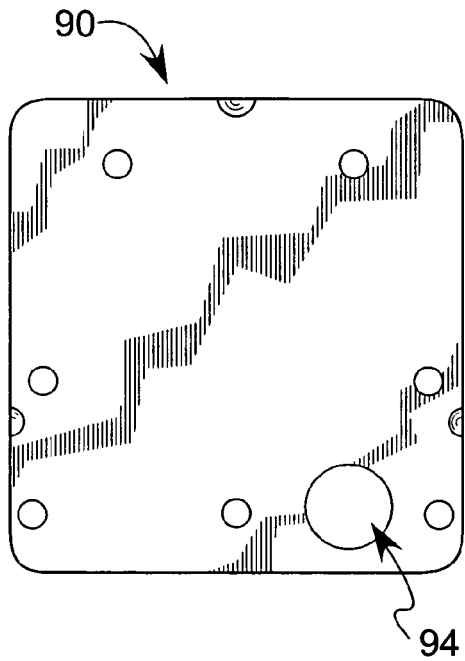 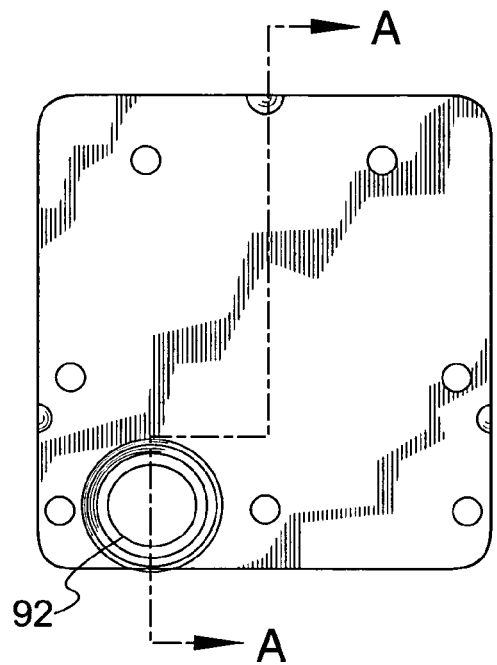
FIG. 16      FIG. 17
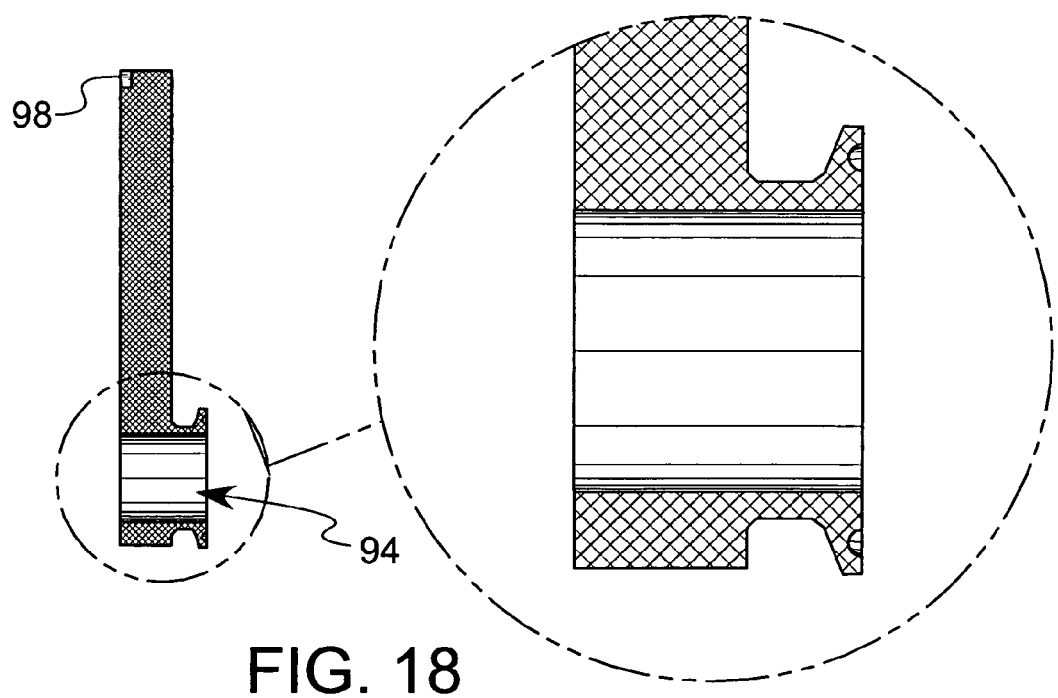
FIG. 18

FLOW DIVIDER

BACKGROUND OF THE INVENTION

1. Field of the Invention

This invention relates generally to devices used to distribute fluent material, and more particularly to a device that divides a material flowing from a single source or a small number of sources into a plurality of streams of substantially equal volumetric flow rate.

2. Description of the Related Art

It is desirable in food processing applications to slice ground sausage rapidly and deposit the sausage on a moving substrate, such as a conveyor belt, beneath the slicing machine. Sausage is commonly made in specialized sausage-making machines that are known in the food processing industry. These machines, and machines that are made to pump previously-ground sausage, produce a stream of ground sausage that is fluent enough to be conveyed as a fluid, but which contains solids and semi-solids, and therefore it cannot be treated as a homogeneous material. Because of the heterogeneity of raw sausage, and the difficulty of conveying such a material conventionally, sausage is often placed in food slicing machines in batches of frozen or semi-frozen logs of a predetermined volume.

In order to produce ground sliced sausage patties rapidly enough to be economically feasible, a machine must not only slice the sausage rapidly, but it must slice the sausage in each of a plurality of lanes that are aligned above and across the moving substrate. These lanes must produce uniform slices, which requires that conditions be uniform in each lane. However, a batch process is particularly inefficient and susceptible to contamination due to the time and cost of producing chilled logs of product and the handling of such logs by personnel. Furthermore, when a slicing machine has several lanes slicing ground sausage in a batch process, there is inefficiency introduced in the form of lost time during refilling, and loss of material at the beginning and end of each log.

It is desirable to have a device that facilitates the use of a continuous process rather than a batch process in order to eliminate the inefficiencies inherent in a batch process, to minimize potential contamination, and to avoid the inconsistencies inherent in batch processes. However, in order to obtain consistent slice characteristics in each of the lanes, any device that conveys sausage to the plurality of lanes must supply the sausage at a volumetric flow rate that is equal in each lane. Equal volumetric flow rate has only been possible conventionally using the batch process, because it has been impossible before the present invention to convey a heterogeneous material such as raw sausage in a plurality of flowing streams of equal volumetric flow rates.

BRIEF SUMMARY OF THE INVENTION

The invention is a flow divider for receiving fluent matter from at least one source, such as a sausage pump, and dividing the fluent matter substantially equally among a plurality of destinations, such as the parts of a food slicing machine corresponding to each of the lanes above a conveyor belt. The invention could alternatively be operated in reverse to function as a mechanism to combine fluent matter from a plurality of sources.

The flow divider comprises a housing with a first chamber. The first chamber is defined by a first radially inwardly facing surface and a first wall. The first chamber has an inlet in fluid communication with said at least one source and an outlet in fluid communication with a first one of said plurality of destinations. A first cylindrical hub is rotatably mounted in the first chamber, a first radial slot extends through the first hub, and a second radial slot extends through the first hub transverse to the first slot. A first vane is slidably mounted in the first slot, and a second vane is slidably mounted in the second slot. Each of the vanes has opposite vane ends seating against the first radially inwardly facing surface.

The flow divider includes a second chamber in the housing. The second chamber is defined by a second radially inwardly facing surface and a second wall, and the second chamber has an inlet in fluid communication with said at least one source and an outlet in fluid communication with a second one of said plurality of destinations. Thus, each chamber has an inlet in fluid communication with the source, and each chamber has an outlet in fluid communication with a corresponding unique destination. Therefore, sausage enters the housing and is divided by the apparatus into equal volumetric flow rate streams going to each destination.

A second cylindrical hub is rotatably mounted in the second chamber and is drivingly linked to the first hub. The second hub has a third radial slot and a fourth radial slot transverse to the third slot. A third vane is slidably mounted in the third slot and a fourth vane is slidably mounted in the fourth slot. Each of the vanes has opposite vane ends abutting the second radially inwardly facing surface.

The flow divider can also include a third and other additional chambers, each being essentially modular and having a substantially identical, or modified, hub, vanes, inlet and outlet. This modular nature of the invention's components permits the construction of a device that causes the flow of fluent material from a source to be divided into essentially as many equal flow rate destination streams as is desirable. In a preferred embodiment, the housing comprises a plurality of attached housing bodies, and the housing bodies, hubs and vanes can all be disassembled for thorough cleaning.

BRIEF DESCRIPTION OF THE SEVERAL VIEWS OF THE DRAWINGS

FIG. 1 is an end view illustrating the preferred housing body.

FIG. 2 is a view in section through the line A—A of FIG. 1.

FIG. 3 is a view in section through the line B—B of FIG. 1.

FIG. 9 is an exploded view in perspective illustrating the preferred housing body and its corresponding hub and vanes.

FIG. 10 is view in perspective illustrating the preferred hub with corresponding vanes in an operable position on the hub.

FIG. 11 is a view in perspective illustrating the preferred hub and vanes in an operable position in the housing body.

FIG. 12 is an exploded view in perspective illustrating the preferred housing body, hub and vanes combined with another housing body, hub and vanes.

FIG. 13 is an exploded view in perspective illustrating a plurality of housing bodies, hubs and vanes mounted together.

FIG. 14 is a view in perspective illustrating the preferred embodiment of the present invention.

FIG. 16 is an end view illustrating another of the preferred end caps.

FIG. 17 is an end view illustrating the opposite end of the end cap shown in FIG. 16.

FIG. 18 is a side view in section through the line A—A of the end cap of FIG. 17.

FIG. 21 is an exploded view in perspective illustrating an alternative hub with more than two vanes.

FIG. 22 is a view in perspective illustrating the alternative hub shown in FIG. 21.

Figure 4:
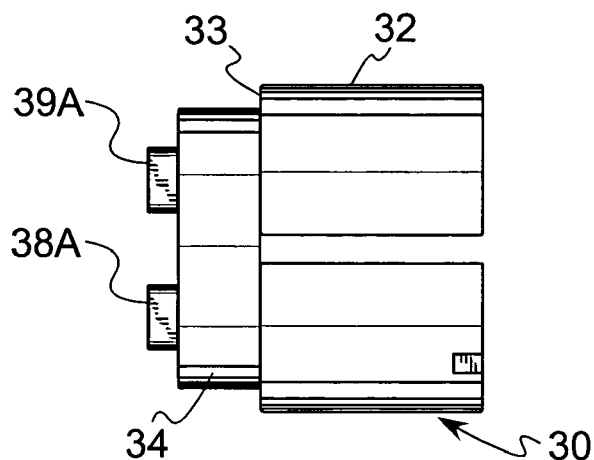
FIG. 4 is a side view illustrating the preferred hub.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

The housing body 10 is illustrated in FIGS. 1 to 3, and is a preferably rectangular block with a central, cylindrical bore defined by the radially inwardly facing, preferably cylindrical, surface 14. The housing body 10 could alternatively have other exterior shapes. A wall 18 is formed on one longitudinal end of the housing body 10, and the wall 18 has an aperture 20 formed therethrough. The aperture 20 is defined by a radially inwardly facing sidewall 21 that is preferably circular cylinder. The axis of the sidewall 21 is offset from the center of the radially inwardly facing cylindrical surface 14, as described below.

For the purposes of the present invention, the term "longitudinal" is defined as substantially parallel to the axis of the bore defined by the radially inwardly facing cylindrical surface 14. Additionally, the terms "cylindrical" and "cylinder" include not only the commonly-understood circular cylinder, but also all other polygonal cylinders, such as elliptical cylinders, rectangular cylinders and oddly-shaped cylinders. Although the radially inwardly facing cylindrical surface 14 preferably forms an elliptical cylinder, it could be modified to form cylinders having other shapes.

Figure 5:
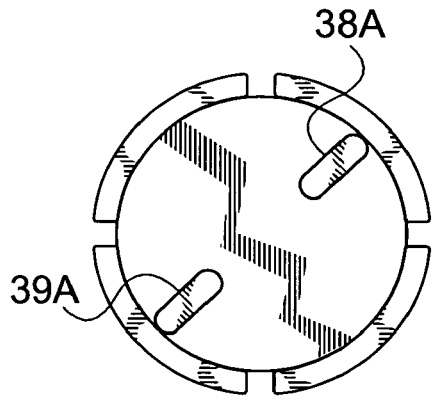
FIG. 5 is an end view illustrating the preferred hub.
Figure 6:
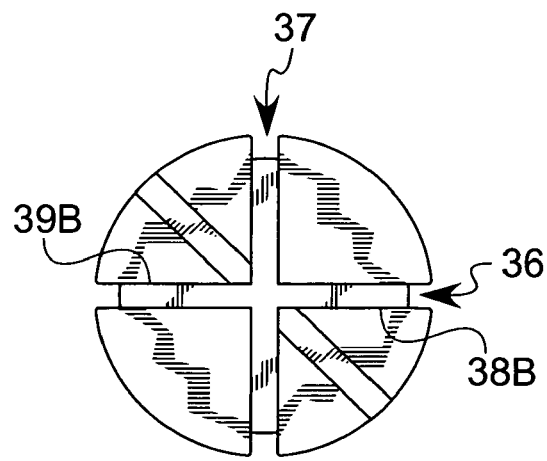
FIG. 6 is an end view illustrating the preferred hub.

A hub 30 is shown in FIGS. 4 to 6 having a main body 32 with a preferably circular cylindrical outer surface, a reduced-diameter, preferably circular cylindrical necked region 34 and a pair of transverse radial slots 36 and 37 extending longitudinally the length of the main body 32. A pair of protrusions, preferably the tangs 38a and 39a, extend longitudinally from one end of the hub 30, and are radially aligned on opposite sides of the hub's 30 axis, as shown in FIGS. 4 and 5. Additionally, a pair of corresponding recesses, preferably the slots 38b and 39b, are formed in the opposite end of the hub 30, as shown in FIG. 6.

In an operable orientation, the hub 30 is mounted in the chamber of the housing body 10 that is defined by the radially inwardly facing cylindrical surface 14 and the wall 18. The necked region 34 is inserted through the aperture 20, which has a diameter that is only a very small amount (e.g., 0.002 inch) larger than the diameter of the necked region 34. Because of the close tolerances and because the housing body 10 and hub 30 are preferably made of a very low friction, food grade material, such as that sold under the trademark DELRIN, the hub 30 can rotate relative to the sidewall 21, but there can be no substantial radial movement of the hub 30 relative to the housing body 10. Furthermore, the shoulder 33, which is formed where the necked region 34 meets the main body 32, seats against the wall 18 when the hub 30 is mounted in the housing body 10. Therefore, longitudinal movement of the hub 30 relative to the housing body 10 in one direction, i.e., toward the wall 18, is prevented when the hub 30 is in its operable position. Movement of the hub 30 away from the wall 18 is possible when the hub 30 is first mounted to the housing body 10, but not when the invention is fully assembled as discussed below.

Figure 7:
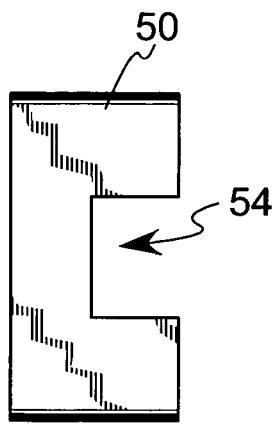
FIG. 7 is a side view illustrating the preferred vane.
Figure 8:
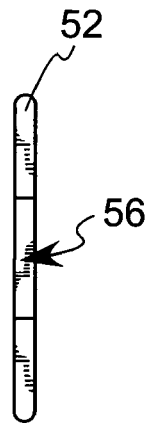
FIG. 8 is an edge view illustrating the preferred vane.
Figure 19:
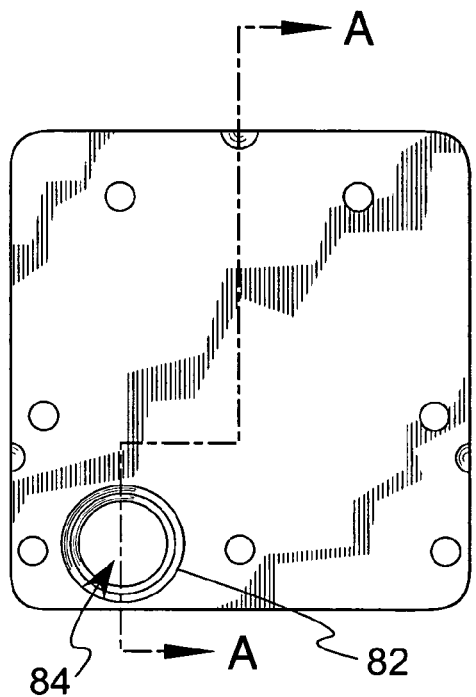
FIG. 19 is an end view illustrating the opposite end of the end cap shown in FIG. 15.

The substantially identical planar vanes 50 and 52 shown in FIGS. 7 and 8 are preferably rectangular with notches 54 and 56, respectively, formed intermediate the opposing vane ends. Also preferably formed of low friction, food grade material such as DELRIN, the vanes 50 and 52 are inserted in the slots 36 and 37 formed in the body 30 as shown in FIGS. 9 and 10, by aligning the notches 54 and 56 in a facing relation to one another. Thus, the vanes 50 and 52 are aligned transverse, and preferably substantially perpendicular, to one another in the preferably substantially perpendicular slots 36 and 37 in the hub 30. The vanes 50 and 52 are 0.245 inches thick, approximately 4 inches long and approximately 2 inches wide in one embodiment.

The vanes 50 and 52 cross over one another, and the longitudinal length of the vanes in their operable position shown in FIG. 10 is no greater than the longitudinal length of each vane. This is due to the notches 36 and 37 that permit overlapping of the vanes 50 and 52. Of course, there could be more than two vanes on a hub, as shown in FIGS. 21 and 22.

When the hub 30 is mounted with the necked region 34 inserted in the aperture 20, and the vanes 50 and 52 are in the operable position on the hub 30 as shown in FIG. 11, the radially extreme tips of the vanes 50 and 52 seat against the radially inwardly facing cylindrical surface 14 in a sealing manner and the longitudinally extreme edges also seat in a sealing manner against the wall 18 and an opposing wall described below. The axis of rotation of the hub 30 is aligned coaxially with the aperture 20, but is positioned nearer to one radial end of the elliptical, radially inwardly facing cylindrical surface 14 than the opposite end. Rotation of the hub 30 about its axis causes the tips of the vanes 50 and 52 to slide along the radially inwardly facing cylindrical surface 14, which surface varies in its distance from the hub's axis of rotation. This variation causes the vanes 50 and 52 to be displaced radially as the hub 30 rotates about its axis. Thus, rotation of the hub 30 through multiple revolutions causes the vanes 50 and 52 to slide in a reciprocating manner through the slots 36 and 37 in the hub 30 while the radially extreme tips of the vanes 50 and 52 maintain contact with the radially inwardly facing cylindrical surface 14.

The preferred elliptical cylinder is defined as having a Major Axial Diameter ($D_{maj}$), a Minor Axial Diameter ($D_{min}$) no greater than 1.5 times the diameter of the hub ($D_h$), and an elliptical ratio ($D_{maj}/D_{min}$) of no greater than 1.05:1. $D_{min}$ is preferably equal to the length of the vane, and $D_{maj}$ is preferably no more than the vane length multiplied by 1.05. Of course, elliptical shapes and sizes other than the preferred ellipse could be used, but this particular ellipse has been found to be useful.

The housing body 10 has an inlet cavity 12 that extends radially outwardly from the radially inwardly facing cylindrical surface 14 into the housing body 10 as shown in FIG. 3. The passage 15 extends tangentially from the inlet cavity 12 toward the passage 13, which extends longitudinally through the housing body 10. The passages 13 and 15 are in fluid communication with the inlet cavity 12, and, in an operable configuration, with a source of fluent material, such as ground sausage. Thus, fluent material can be supplied to the chamber of the housing body 10 by conveying it through the passage 13, through the passage 15 and then through the inlet cavity 12. The inlet cavity 12 could alternatively be made up of a plurality of inlet cavities. This is not preferred but is a possible alternative to the preferred embodiment.

The housing body 10 also has an outlet cavity 16 that extends radially outwardly from the radially inwardly facing cylindrical surface 14 into the housing body 10 as shown in FIG. 2. The passage 17, which extends tangentially through the housing body 10 and terminates in the flange 19, is in fluid communication with the outlet cavity 16. In an operable configuration, the flange 19 is connected to a tube or other conduit that connects to a food slicing machine, such as those machines sold by the J.E. Grote Company. Thus, through the conduit and the passage 17, the outlet cavity 16 is in fluid communication with a destination of fluent material, such as a food slicing machine. Fluent material is thereby removed from the chamber of the housing body 10 by conveying it through the outlet cavity 16 and the passage 17. The outlet cavity 16 could be made up of a plurality of outlet cavities. This is not preferred but is a possible alternative to the preferred embodiment.

The housing body 10 has a plurality of sub-chambers within the chamber. These sub-chambers are formed between the vanes 50 and 52, the hub's radially outwardly facing surface and the radially inwardly facing cylindrical surface 14. These sub-chambers can change in volume as the hub 30 is rotated, as in a conventional vane pump so that during a portion of each revolution of the hub each sub-chamber is increasing, during a portion of each revolution each sub-chamber is decreasing, and during a portion of each revolution each sub-chamber stays the same. This increasing and decreasing volume causes the hub to rotate as described next.

Each sub-chamber receives fluent material, such as ground sausage, through the inlet cavity 12 when the raw sausage is forced through the passage 13. The sausage enters the sub-chamber under pressure, and an outward force is exerted by the sausage against all sides of the sub-chamber. Because the vane on one side of the sub-chamber has greater surface area than the vane on the opposite side, the outward force caused by the pressurized sausage exerts a net force on the hub 30 in one circumferential direction. This force causes the hub 30 to rotate.

As the hub 30 rotates, the sub-chamber being filled continues to be filled, and the next adjacent sub-chamber begins to be filled once its leading vane passes over the inlet cavity 12. After the trailing vane of the first sub-chamber travels past the inlet cavity 12, the first sub-chamber ceases to be filled, and the next adjacent sub-chamber is the only sub-chamber being filled with sausage under pressure, which continues the rotation of the hub 30.

The rotation of the hub 30 drives the sausage in the sub-chambers around the hub to the opposite side of the radially inwardly facing cylindrical surface 14 where the outlet cavity 16 is formed. When the leading vane of the sub-chamber passes over the outlet cavity 16, the sub-chamber begins to decrease in volume due to the shape of the radially inwardly facing cylindrical surface 14, thereby forcing the sausage in the sub-chamber out of the sub-chamber into the outlet cavity 16. This continues until the sub-chamber is substantially empty. The forcing of sausage or other fluent material into the chamber and forcing of sausage out of the chamber is a continuous process.

It is important to note that the sub-chambers are of consistent volume once they have been filled and before the sausage begins to be conveyed out of the sub-chamber. There is no substantial leaking of sausage from one sub-chamber to another, and there is no substantial difference in the volume of sausage in one sub-chamber and the volume of sausage of another sub-chamber during the same position of the sub-chamber in the revolution of the hub 30.

These equal volume sub-chambers make the invention an effective flow divider when two or more such combinations of the housing body 10, hub 30 and vanes 50 and 52 are drivingly linked together. Such a combination is shown in FIGS. 12 to 14. For example, the housing body 210 is shown in FIG. 12 in a coaxial relation to the housing body 10 described above. The housing body 210 is substantially identical in all respects to the housing body 10, although a person of ordinary skill will recognize that some modifications could be made to the housing body 210. The housing body 210 has a hub 230 and vanes 250 and 252 mounted therein. The hub 230 is rotatably mounted in the housing body 210 in the same manner as described above for the hub 30 in the housing body 10.

The housing bodies 10 and 210 are rigidly mounted together, preferably by screws, as shown in FIG. 14, or by any other preferably removable fastener, such as clamps or bands. As shown in FIG. 3, the integral machined tabs 22 and mating notches 24 which are preferably formed on opposite sides of all housing bodies, matingly engage to align the adjacent housing bodies to one another to accurately hold their coaxial relations and simplify assembly of the device. Conventional rubber O-rings 60 and 62 are inserted in grooves adjacent the radially inwardly facing cylindrical surface 14 and the passage 13, respectively, in order to obtain a seal between the housing bodies. It is possible to weld or otherwise permanently fasten the housing bodies 10 and 210 together, but this eliminates the possibility of separating the housing bodies later for thorough cleaning. The wall 218 (not shown) of the housing body 210 is substantially identical to the wall 18 of the housing body 10, and encloses the chamber of the housing body 10 at the side opposite the wall 18. The end of the hub 30 seats against this wall 218.

It is desirable in some circumstances to have a plurality of housing bodies 10, 210, 310 and 410 mounted together as illustrated in FIGS. 13 and 14. The number of housing bodies that can be mounted together is essentially unlimited. The housing bodies 310 and 410 are substantially identical to the housing bodies 10 and 210, and include corresponding hubs, vanes, inlet and outlet cavities, and all other components that are combined with the housing bodies 10 and 210 as described above. These housing bodies 210, 310 and 410 have the flanges 219, 319 and 419, respectively, which are in fluid communication with outlet cavities (not shown) in the respective chambers that are substantially identical to the outlet cavity 16. In an operable configuration, the flanges are all connected to tubes or other conduits that connect the chambers to a food slicing machine.

When the housing bodies 10, 210, 310 and 410 are mounted together, their respective tabs and notches engage for alignment, and their respective hubs are also drivingly linked together. The linking of the hubs 30 and 230 will be described for illustrative purposes, with the understanding that a substantially identical link is used with the hubs in the housing bodies 310 and 410 and any other housing bodies that are mounted thereto. The tangs 38a and 39a extend longitudinally into the slots 238b and 239b, which are substantially identical to the slots 38b and 39b in the hub 30, when the housing bodies 10 and 210 are displaced longitudinally toward one another to mount the housing bodies 10 and 210 together. The tangs 38a and 39a are inserted longitudinally into the slots 238b and 239b, and are engaged frictionally by the surfaces that define the slots to prevent any substantial relative rotational motion between the hubs 30 and 230, but to permit longitudinal withdrawal. Therefore, when one hub is rotated, the other hub is rotated the same amount and in the same direction. The hubs 30 and 230 are, in effect, therefore a single rotating body. Many other equivalent means for drivingly linking the hubs will become apparent to the person of ordinary skill from the description.

Figure 15:
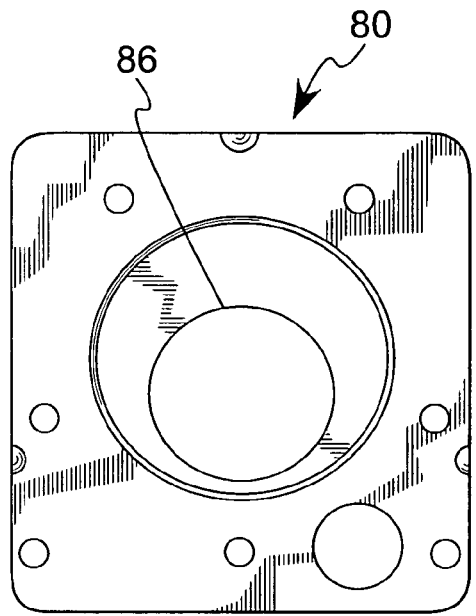
FIG. 15 is an end view illustrating one of the preferred end caps.
Figure 20:
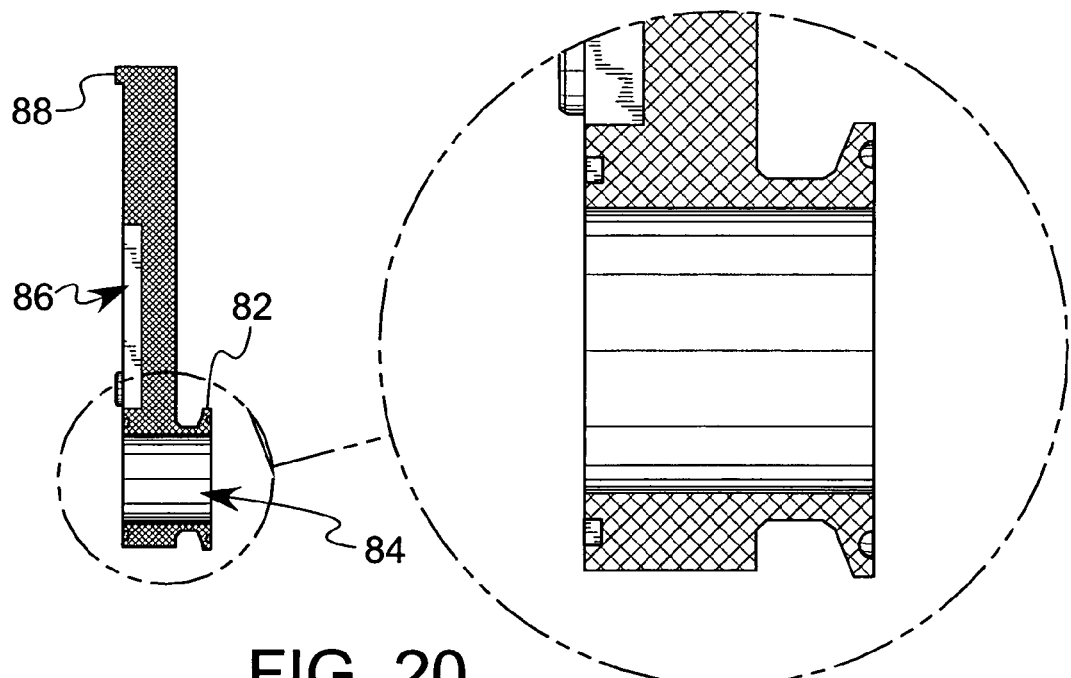
FIG. 20 is a side view in section through the line A—A of the end cap of FIG. 19.

Once the entire combination of housing bodies and their corresponding hubs and vanes are assembled into the combination shown in FIG. 13, the end caps 80 and 90 are attached at opposite ends. The end cap 80 is shown in detail in FIG. 15, and the end cap 90 is shown in detail in FIG. 16. The end caps 80 and 90 are preferably made of a food grade, low friction polymer, such as DELRIN. The end caps 80 and 90 are closures over the internal chambers of the housing bodies to prevent leakage of gases, liquids or the fluent sausage out of the housing bodies.

The end cap 90 is a solid, planar structure having an aperture 94 formed through it that terminates in a flange 92. The flange 92 is on the side of the cap 90 that will be placed outside of the combination of housing bodies, and permits attachment of a tube or other fluent material-conveying conduit having a central passageway that aligns with the aperture 94. The end cap 90 aligns with the adjacent housing body by receiving the housing body's tab into the notch 98. Sausage, or other fluent material, is conveyed under pressure through the aperture 94 and into the passage 13 of the housing body 10 (see FIGS. 1 and 3), which is in fluid communication with the substantially identical passages formed in the housing bodies 210, 310 and 410, which align longitudinally with the passage 13 and the aperture 94. Each housing body's passage is in fluid communication with its corresponding inlet cavity to permit sausage or other fluent material conveyed therethrough to enter the chambers of the respective housing bodies. The end of the longitudinal passage formed by the aperture 94 and the passages in the housing bodies terminates at the opposite end of the combination of housing bodies where the end cap 80 attaches.

The end cap 80 is a solid, planar structure having an aperture 84 formed through it that terminates in a flange 82. The flange 82 is on the side of the cap 80 that will be placed outside of the combination of housing bodies, and is capped in a preferred embodiment, but can be used instead of the flange 92 if it is desired to attach the tube or other conduit from that side of the apparatus. This makes the apparatus reversible. Additionally, it is contemplated that if a large number of housing bodies are used, one might wish to supply fluent material to both ends of the apparatus to avoid "starving" some chambers. Still further, the flange 82 could be used to remove air from the system at startup. This is not necessary under normal operation with sausage, but could be desirable in the future, or when used with a different fluent material.

The cap 80 has a preferably circular recess 86 formed in the side that faces toward the housing 410 to which the cap 80 attaches. The recess 86 is slightly deeper than the length of the tangs 438a and 439a (not shown) formed on the hub 430 (not shown) mounted in the housing 410, which hub and tangs are substantially identical to the hub 30 with tangs 38a and 39a shown in FIG. 4. Additionally, the recess 86 has a diameter slightly greater than the distance between the extreme radial edges of the tangs 438a and 439a. In an operable position the recess 86 is aligned coaxially with the hub 430 with the tangs 438a and 439a inserted within the recess 86. The recess 86 accommodates the protruding tangs that would otherwise be drivingly linked to an adjacent hub, and makes unnecessary the use of a different hub with no tangs. The cap 80 aligns with the adjacent housing body by inserting its tab 88 into the mounting body's notch.

When sausage is forced into the chambers of the housing bodies 10, 210, 310 and 410, the hubs 30 and 230 (and the corresponding hubs within the housing bodies 310 and 410) rotate together and at the same rate described above in relation to the housing body 10. Thus, the volume of sausage that enters the entire apparatus is divided between the chambers in the apparatus, and exits the chambers in equal volume streams. The combination of such housing bodies, hubs and vanes functions as a flow divider, inasmuch as there is one inlet for pressurized sausage (or other fluent material) to enter the combination, and each housing body has its own outlet that, due to the function of the drivingly linked hubs, meters out a volume of sausage that is equal at all outlets. The apparatus functions as a very effective flow divider that can have its inlet connected to a source, such as a sausage-making machine or pump, and each of its outlets connected to a destination, such as one lane of a sausage-slicing machine. In experiments, the invention has produced results varying between 0.06 to 0.08 ounces in weight between its outlet flow streams.

In the preferred embodiment described above, there is a source of fluent material, or possibly two sources of fluent material, that are forced into the apparatus, which divides the fluent material into a greater number of equal flow rate streams of fluent material. The number of sources is not critical, although in a preferred embodiment only one source exists, and the number of destinations is not critical. The apparatus operates to divide one or a small number of sources of fluent material into a greater number of equal volumetric flow rate streams of fluent material. Alternatively, the relative sizes of the chambers can be modified to have unequal volume flow rates at different outlets, if desired.

The apparatus described above can also operate in reverse by forcing fluent material under pressure into the outlet cavities. This causes the hubs and vanes to rotate backward at the same rate and force the fluent material out the inlet cavities to be combined in the single passage and flow out of the passage as a single stream. This may be desirable, for example, if one wishes to combine various types of fluent material from a plurality of sources into a single stream of fluent material. When the apparatus is operated in this manner, it will be noticed that the inlets and outlets have the opposite function than their names imply, and therefore the names used in the description above for the flow divider can appropriately be changed.

The embodiments described above permit detachment of all components of the present invention from one another for cleaning. Additionally, each of the hubs, housing bodies and vanes is substantially identical to, and therefore interchangeable with, every other hub, housing body and vane. This makes re-assembly after cleaning very easy. Of course, it would be possible to make some of the parts permanently attached, but this could result in more difficulty in cleaning. Nonetheless, such embodiments fall within the scope of the invention. For example, the housing bodies could be a single housing that is divided into two chambers, each accessible from an opposite end of the housing. Thus, it will be seen that the housing can be made up of multiple housing bodies, each having at least one chamber, or one housing body with at least two chambers. The number of "modules" of housing bodies, vanes and hubs is virtually unlimited, and could range from two to any number greater than two.

While certain preferred embodiments of the present invention have been disclosed in detail, it is to be understood that various modifications may be adopted without departing from the spirit of the invention or scope of the following claims.

The invention claimed is:

1. A flow divider for receiving fluent matter from at least one source and dividing the fluent matter substantially equally among a plurality of destinations, the flow divider comprising:
    (a) a housing;
    (b) a first chamber in the housing, the first chamber being defined by a first radially inwardly facing surface and a first wall, the first chamber having an inlet cavity formed in the first radially inwardly facing surface, wherein the inlet cavity is in fluid communication with a source passage that is formed through the housing and is spaced from the chamber, and the source passage has an axis that is substantially parallel to the axis of the first radially inwardly facing surface and is in fluid communication with said at least one source, the chamber also having an outlet cavity formed in the first radially inwardly facing surface in fluid communication with a first one of said plurality of destinations;
    (c) a first cylindrical hub rotatably mounted in the first chamber and having an axis substantially parallel to the axis of the first radially inwardly facing surface, a first radial slot extending through the first hub, and a second radial slot extending through the first hub transverse to the first slot;
    (d) a first vane slidably mounted in the first slot and having opposite vane ends seating against the first radially inwardly facing surface;
    (e) a second vane slidably mounted in the second slot and having opposite vane ends seating against the first radially inwardly facing surface;
    (f) a second chamber in the housing, the second chamber being defined by a second radially inwardly facing surface and a second wall that separates the first chamber from the second chamber, the second chamber having an inlet cavity formed in the second radially inwardly facing surface, wherein the inlet cavity is in fluid communication with the source passage and is in fluid communication with said at least one source, the second chamber also having an outlet cavity formed in the second radially inwardly facing cylindrical surface in fluid communication with a second one of said plurality of destinations;
    (g) a second cylindrical hub rotatably mounted at least partially through the second wall and extending into the second chamber and having an axis substantially parallel to the axis of the second radially inwardly facing surface and drivingly linked to the first hub, a third radial slot extending through the second hub, and a fourth radial slot extending through the second hub transverse to the third slot;
    (h) a third vane slidably mounted in the third slot and abutting the second radially inwardly facing surface at opposite vane ends; and
    (i) a fourth vane slidably mounted in the fourth slot and abutting the second radially inwardly facing surface at opposite vane ends.

2. The flow divider in accordance with claim 1, further comprising:
    (a) a third chamber in the housing, the third chamber being defined by a third radially inwardly facing surface and a third wall that separates the second chamber from the third chamber, the third chamber having an inlet cavity formed in the third radially inwardly facing surface, wherein the inlet cavity is in fluid communication with the source passage, the second chamber also having an outlet cavity formed in the third radially inwardly facing cylindrical surface in fluid communication with a third one of said plurality of destinations;
    (b) a third cylindrical hub rotatably mounted at least partially through the third wall and extending into the third chamber and having an axis substantially parallel to the axis of the third radially inwardly facing surface and drivingly linked to the second hub, a fifth radial slot extending through the third hub, and a sixth radial slot extending through the third hub transverse to the fifth slot;
    (c) a fifth vane slidably mounted in the fifth slot and abutting the third radially inwardly facing surface at opposite vane ends; and
    (d) a sixth vane slidably mounted in the sixth slot and abutting the third radially inwardly facing surface at opposite vane ends.

3. The flow divider in accordance with claim 1, wherein the housing, hubs and vanes have connecting structures that permit them to be disconnected and disassembled for cleaning.

4. The flow divider in accordance with claim 1, wherein said first and second hubs are drivingly linked by at least one protrusion extending from the second hub into at least one corresponding recess formed in the first hub.

5. The flow divider in accordance with claim 4, wherein said at least one protrusion further comprises at least one longitudinal tang extending from one end of the second hub, and said corresponding recess further comprises at least one longitudinal slot formed in one end of the first hub.

6. The flow divider in accordance with claim 1, further comprising a first end cap mounted to a first end of the housing, and a second end cap mounted to a second, opposite end of the housing, said end caps forming closures for the chambers.

7. The flow divider in accordance with claim 6, wherein said first end cap has a recess for receiving at least one protrusion formed on one of said hubs.

8. The flow divider in accordance with claim 7, wherein each of said hubs has a reduced-diameter necked region forming a shoulder, and an aperture is formed in each wall at each chamber for rotatably receiving said necked region of a corresponding hub.

9. A flow divider for receiving fluent matter from at least one source and dividing the fluent matter substantially equally among a plurality of destinations, the flow divider comprising:

(a) a first housing with a first chamber defined by a first radially inwardly facing cylindrical surface and a first wall, the first chamber having an inlet cavity formed in the first radially inwardly facing cylindrical surface, wherein the inlet cavity is in fluid communication with a corresponding source passage that is formed through the first housing and is spaced from the first chamber, and the source passage has an axis that is substantially parallel to the axis of the first radially inwardly facing cylindrical surface and is in fluid communication with said at least one source, the first chamber also having an outlet cavity formed in the first radially inwardly facing cylindrical surface in fluid communication with a first one of said plurality of destinations;

(b) a first cylindrical hub rotatably mounted in the first chamber substantially coaxial with the radially inwardly facing cylindrical surface, a first radial slot extending through the first hub, and a second radial slot extending through the first hub transverse to the first slot;

(c) a first vane slidably mounted in the first slot and having opposite vane ends seating against the first radially inwardly facing cylindrical surface;

(d) a second vane slidably mounted in the second slot and having opposite vane ends seating against the first radially inwardly facing cylindrical surface;

(e) a second housing rigidly mounted to the first housing, the second housing having a second chamber defined by a second radially inwardly facing cylindrical surface and a second wall that separates the first chamber from the second chamber, the second chamber having an inlet cavity formed in the second radially inwardly facing cylindrical surface, wherein the inlet cavity is in fluid communication with a corresponding source passage that is formed through the second housing and is spaced from the second chamber, and the source passage has an axis that is substantially parallel to the axis of the second radially inwardly facing cylindrical surface and is in fluid communication with said at least one source, the chamber also having an outlet cavity formed in the second radially inwardly facing cylindrical surface in fluid communication with a second one of said plurality of destinations;

(f) a second cylindrical hub rotatably mounted at least partially through the second wall and extending into the second chamber, and having an axis that is substantially parallel to the axis of the second radially inwardly facing cylindrical surface and drivingly linked to the first hub, a third radial slot extending through the second hub, and a fourth radial slot extending through the second hub transverse to the third slot;

(g) a third vane slidably mounted in the third slot and abutting the second radially inwardly facing cylindrical surface at opposite vane ends; and (h) a fourth vane slidably mounted in the fourth slot and abutting the second radially inwardly facing cylindrical surface at opposite vane ends;

wherein the source passages formed through each of said housings align to form a conduit in fluid communication with each inlet cavity and said at least one source.

10. The flow divider in accordance with claim 9, further comprising:

(a) at least a third housing rigidly mounted to the second housing, the third housing having a third chamber defined by a third radially inwardly facing cylindrical surface and a third wall that separates the second chamber from the third chamber, the third chamber having an inlet cavity formed in the third radially inwardly facing cylindrical surface, wherein the inlet cavity is in fluid communication with a corresponding source passage formed through the third housing and is spaced from the third chamber, and the source passage has an axis that is substantially parallel to the axis of the third radially inwardly facing cylindrical surface and is in fluid communication with said at least one source, and the chamber also having an outlet cavity formed in the third radially inwardly facing cylindrical surface in fluid communication with a third one of said plurality of destinations;

(b) a third cylindrical hub rotatably mounted at least partially through the third wall and extending into the third chamber, and having an axis substantially parallel to the axis of the third radially inwardly facing cylindrical surface and drivingly linked to the second hub, a fifth radial slot extending through the third hub, and a sixth radial slot extending through the third hub transverse to the fifth slot;

(c) a fifth vane slidably mounted in the fifth slot and abutting the third radially inwardly facing cylindrical surface at opposite vane ends; and (d) a sixth vane slidably mounted in the sixth slot and abutting the third radially inwardly facing cylindrical surface at opposite vane ends.

11. The flow divider in accordance with claim 9, wherein the housings, hubs and vanes have connecting structures that permit them to be disconnected and disassembled for cleaning.

12. The flow divider in accordance with claim 9, wherein said first and second hubs are drivingly linked by at least one protrusion extending from the second hub into at least one corresponding recess formed in the first hub.

13. The flow divider in accordance with claim 12, wherein said at least one protrusion further comprises a pair of longitudinal tangs extending from one end of the second hub, and said corresponding recess further comprises a pair of longitudinal slots formed in one end of the first hub.

14. The flow divider in accordance with claim 9, further comprising a first end cap mounted to a first end of the housings, and a second end cap mounted to a second, opposite end of the housings, said end caps forming closures for the chambers.

15. The flow divider in accordance with claim 14, wherein said first end cap has a recess for receiving at least one protrusion formed on one of said hubs.

16. The flow divider in accordance with claim 15, wherein each of said hubs has a reduced-diameter necked region forming a shoulder, and an aperture is formed in each wall of each housing for rotatably receiving said necked region of a corresponding hub.

17. The flow divider in accordance with claim 9, wherein each of the housings has a tab on one end and a notch on an opposite end for matingly engaging a notch and a tab, respectively, on adjacent structures.

18. A device for receiving fluent matter from a plurality of sources and combining the fluent matter substantially equally to at least one destination, the device comprising:

(a) a housing;

(b) a first chamber in the housing, the first chamber being defined by a first radially inwardly facing surface and a first wall, the first chamber having an inlet cavity formed in the first radially inwardly facing surface in fluid communication with a first one of said plurality of sources and an outlet cavity formed in the first radially inwardly facing surface, wherein the outlet cavity is in fluid communication with a destination passage that is formed through the housing and is spaced from the first chamber, and the destination passage has an axis that is substantially parallel to the axis of the first radially inwardly facing surface and is in fluid communication with said at least one destination;

(c) a first cylindrical hub rotatably mounted in the first chamber and having an axis substantially parallel to the axis of the first radially inwardly facing surface, a first radial slot extending through the first hub, and a second radial slot extending through the first hub transverse to the first slot;

(d) a first vane slidably mounted in the first slot and having opposite vane ends seating against the first radially inwardly facing surface;

(e) a second vane slidably mounted in the second slot and having opposite vane ends seating against the first radially inwardly facing surface;

(f) a second chamber in the housing, the second chamber being defined by a second radially inwardly facing surface and a second wall that separates the first chamber from the second chamber, the second chamber having an inlet cavity formed in the first radially inwardly facing surface in fluid communication with a second one of said plurality of sources and an outlet cavity formed in the second radially inwardly facing surface, wherein the outlet cavity is in fluid communication with the destination passage;

(g) a second cylindrical hub rotatably mounted at least partially through the second wall and extending into the second chamber and having an axis substantially parallel to the axis of the second radially inwardly facing surface and drivingly linked to the first hub, a third radial slot extending through the second hub, and a fourth radial slot extending through the second hub transverse to the third slot;

(h) a third vane slidably mounted in the third slot and abutting the second radially inwardly facing surface at opposite vane ends; and (i) a fourth vane slidably mounted in the fourth slot and abutting the second radially inwardly facing surface at opposite vane ends.

19. The device in accordance with claim 18, further comprising:

(a) a third chamber in the housing, the third chamber being defined by a third radially inwardly facing surface and a third wall that separates the second chamber form the third chamber, the third chamber having an inlet cavity formed in the third radially inwardly facing surface in fluid communication with a third one of said plurality of sources and an outlet cavity formed in the third radially inwardly facing surface, wherein the outlet cavity is in fluid communication with the destination passage;

(b) a third cylindrical hub rotatably mounted at least partially through the third wall and extending into the third chamber and having an axis substantially parallel to the axis of the third radially inwardly facing surface and drivingly linked to the second hub, a fifth radial slot extending through the third hub, and a sixth radial slot extending through the third hub transverse to the fifth slot;

(c) a fifth vane slidably mounted in the fifth slot and abutting the third radially inwardly facing surface at opposite vane ends; and (d) a sixth vane slidably mounted in the sixth slot and abutting the third radially inwardly facing surface at opposite vane ends.

20. The device in accordance with claim 18, wherein the housing, hubs and vanes have connecting structures that permit them to be disconnected and disassembled for cleaning.

21. The device in accordance with claim 18, wherein said first and second hubs are drivingly linked by at least one protrusion extending from the second hub into at least one corresponding recess formed in the first hub.

22. The device in accordance with claim 21, wherein said at least one protrusion further comprises at least one longitudinal tang extending from one end of the second hub, and said corresponding recess further comprises at least one longitudinal slot formed in one end of the first hub.

23. The device in accordance with claim 18, further comprising a first end cap mounted to a first end of the housing, and a second end cap mounted to a second, opposite end of the housing, said end caps forming closures for the chambers.

24. The device in accordance with claim 23, wherein said first end cap has a recess for receiving at least one protrusion formed on one of said hubs.

25. The device in accordance with claim 24, wherein each of said hubs has a reduced-diameter necked region forming a shoulder, and an aperture is formed in the wall at each chamber for rotatably receiving said necked region of a corresponding hub.

* * * * *